United States Patent Office 3,801,591
Patented Apr. 2, 1974

3,801,591
PRODUCTION OF PHTHALOCYANINE
PIGMENT
Julius Jackson, Westfield, N.J., assignor to E. I. du Pont de Nemours and Company, Wilmington, Del.
No Drawing. Filed June 12, 1972, Ser. No. 261,810
Int. Cl. C09b 47/04
U.S. Cl. 260—314.5          3 Claims

ABSTRACT OF THE DISCLOSURE

A metal phthalocyanine pigment composed almost exclusively of the α I polymorph is prepared by a process in which crude metal phthalocyanine is subjected to controlled precipitation in two sages followed by conditioning of the resultant slurry under intense agitation to generate an air/liquid interface and thereby facilitate flocculation, hence filtration.

BACKGROUND OF THE INVENTION

This invention relates to an improved process for the production of phthalocyanine pigments, and more specifically to steps for treating a phthalocyanine pigment slurry to improve its filterability characteristics.

Processes for the production of phthalocyanine pigments are well known. Among the patents which disclose and claim such processes and which account for much of the present-day production of these valuable pigments are U.S. 2,197,458, U.S. 2,799,594, U.S. 2,799,595, U.S. 2,820,796, and U.S. 2,833,784.

In copending patent application U.S. Ser. No. 111,618, filed Feb. 1, 1971 now U.S. Pat 3,717,493, the disclosure of which is incorporated herein by reference, it is disclosed that the so-called α I polymorph is an especially valuable pigmentary form of phthalocyanine and that a product composed almost exclusively thereof can be obtained by careful control of conditions leading to the formation and hydrolysis of a phthalocyanine tetrahydrosulfate intermediate.

More particularly the process of said U.S. Pat. 3,717,493 involves the consecutive steps of:

(1) dissolving crude metal phthalocyanine, either chlorinated or not, in concentrated sulfuric acid of at least 96% by weight $H_2SO_4$, a convenient weight ratio being about one part of the crude phthalocyanine to form 8.5 to 9.5 parts of the acid, (2) rapidly diluting the solution of step (1) with water or dilute sulfuric acid in a first-stage mixing zone, the dilution being effected to provide a liquid-phase acid concentration of about 64 to about 82% by weight and a temperature of about 86° to 140° C., whereby the phthalocyanine is precipitated almost exclusively as the corresponding phthalocyanine tetrahydrosulfate, (3) holding the phthalocyanine tetrahydrosulfate for a time to achieve crystal growth to within a particle size range of 0.01 to 0.2µ.

(4) discharging the resultant slurry into a second-stage mixing zone and effecting rapid dilution with water to a liquid-phase acid concentration below about 40% by weight, (5) subjecting the slurry product of step (4) to a conditioning to complete crystal growth and perfection, and (6) recovering the phthalocyanine pigment from the diluted slurry.

Although that process is a significant advance over prior art processes in that pigments of outstanding properties can be obtained on a continuous basis, it has been found desirable to seek improvements in the filtration characteristics of the acid-pigment slurries intermediate therein so that the pigment can be recovered as efficiently as it is precipitated.

The present invention, then, is directed toward the achievement of this goal, and particularly toward the production of acid-pigment slurries which are filterable, without bleedthrough, using rotary vacuum filters and standard readily available filter cloths and without detriment to the quality of the pigments produced.

SUMMARY OF THE INVENTION

In accordance with the invention the above-described process of U.S. Pat 3,717,493 is utilized but with a particular conditioning step, i.e., whereby to effect crystal growth and perfection of the phthalocyanine precipitate. In particular the conditioning step utilizes intense agitation to generate an air/liquid interface which, it has been found, assists in flocculation of the particles. In general, sufficient air/liquid interface is created for this purpose when the slurry has been adequately foamed up to increase its volume by at least about 15%, and preferably by about 50 to 150%. The agitation, which of course should be low in shear so as not to destroy the foam, is continued for at least about 20 minutes and at a temperature of about 50° C. to the boil with, as is preferred, additives to aid in maintaining the air/liquid interface. In any event the effect of the conditioning step is to yield a slurry of improved filterability characteristics.

Although the reasons for the improved filterability are not fully understood, it appears that the air/liquid interface of the foam causes the hydrophilic phthalocyanine particle to migrate thereto with a resultant increase in flocculation rate. Thus in general, the higher is the degree of agitation of the slurry (faster stirring), the greater is the frequency of contact of the particles and the higher the rate of flocculation. Whatever the explanation be, the coherence of the particles is only a temporary condition during the agitation and filtration steps because subsequently the particles can be easily dispersed for end-use applications, while exhibiting the tinctorial characteristics of small partcle size pigments.

Various additives and additive combinations can be used in the conditioning step to influence the amount of air/liquid interface that is generated. For example there may be utilized a polar organic liquid such as phenol, a substituted phenol such as 2,3-dimethyl phenol, 2,5-dimethyl phenol, 2,6-ditertiary butyl phenol, or salicyclic acid, or there may be used other compounds such as β-naphthol, or benzoic acid. Such polar organic liquids must have at least some degree of water solubility. Alternatively there may be used a combination of an essentially nonpolar organic liquid such as perchloroethylene, hexane or orthodichlorobenzene together with a surfactant. One surfactant which has been found to be particularly useful in this regard is the sodium salt of p-toluene sulfonic acid. In general the amount of polar or nonpolar organic liquid should be in the range of about 1 to 20% by weight based on the pigment. The amount of surfactant employed should be in the amount of about 1 to 10% by weight based on the pigment.

Apart from the various aspects of the conditioning step, discussed above, the remaining steps may follow those of U.S. Pat. 3,717,493. It will be understood that the production of various types of phthalocyanines is contemplated. Thus, the slurries to be treated may comprise crystal-unstable, chlorine-free α-phase copper phthalocyanine, or crystal-stable α-phase chlorinated copper phthalocyanine containing typically up to about 4.2% chlorine. The process is also applicable to phthalocyanine pigments of metals other than copper, e.g., nickel, or cobalt.

The following examples illustrate the practice of the invention. Parts and percentages are by weight unless otherwise indicated.

Example 1

Crude chlorine-free copper phthalocyanine produced by any of the well-known prior art processes, such as for example U.S. 2,197,458, is put into solution with 98% sulfuric acid in a 1:9 weight ratio. On the continuous basis the solution, at 30° C., is then drowned in water, with rapid mixing, at a pressure of $9.8 \times 10^4$ mm. Hg. The mixing is carried out in a series of pipes such that a stream of acid solution of the crude pigment flows together with a separate stream of water, with agitation to obtain a diluted slurry of the copper phthalocyanine tetrahydrosulfate. The streams are mixed in the volume ratio of 4.42 parts of acid solution to 2.1 parts of water. The acid concentration of the liquid phase formed in this first-stage mixing is 75% and the temperature of the resultant mixture is 128° C. About 25 liters of slurry are produced per minute. After then flowing through another pipe (retention time 1.0 second), a further dilution is effected by very rapid mixing with another water at the rate of 6.52 parts by volume of slurry per 10.1 parts of water, the rate being such that about 70 liters of diluted slurry are produced per minute. The tetrahydrosulfate resulting from the first dilution is thus rapidly hydrolyzed to form pigmentary chlorine-free phthalocyanine in the α I phase. The concentration of the effluent from the second-stage mixer is 37% sulfuric acid and the pigment content is 3.7% by weight.

One thousand cc. of this acid pigment slurry is collected and removed to a reactor vessel of 2 liter capacity, equipped with an agitator and having a glass cover with multiple openings to permit measurement of internal temperature, condensation by reflux, and introduction of steam for flashing and distillation. The reactor is heated by external electrical means.

The slurry containing about 42 grams of pigment is heated to 90° C. and there is added to it 4.5%, based on the weight of the pigment, of the sodium salt p-toluene sulfonic acid and 7.5%, also based on pigment weight, of tetrachloroethylene.

The slurry is subjected to intense, high speed agitation. The paddle stirrer turns at 660 revolutions per minute. The foaming of the slurry causes an increase in volume on the order of 100%, i.e., to nearly double its original volume. The agitation is continued for one hour, with the temperature being maintained at 90° C.

At the conclusion of this time, steam is introduced below the liquid level of the slurry and the tetrachloroethylene thus removed. This steam distillation causes the foam to break and the slurry returns to approximately the original volume.

The slurry is filtered hot through a polyester fiber filter cloth and washed. There is no bleedthrough of pigment, i.e., an essentially pigment-free filtrate at a filter rate of 27 kg./m.²/hr. is obtained.

The pigment resulting from this treatment shows tinctorial properties superior to a standard commercial chlorine-free copper phthalocyanine pigment by flushout in a standard printing ink system.

Examples 2–4

Using the same procedure and equipment described in Example 1, three additional portions of acid-pigment slurry obtained as described in that example are treated at 90° C. for various times and at various rates of agitation. Filtration tests are carried out in the manner described above. The following table summarizes these experiments:

| Example number: | Time at 90° C. (hours) | Agitation rate (r.p.m.) | Filtration rate (kg./m².)/hr.) |
|---|---|---|---|
| 2 | 3½ | 420 | 21 |
| 3 | 2 | 570 | 26 |
| 4 | 3 | 660 | 24 |

As in Example 1, the pigments resulting from these treatments are satisfactory in all respects as regards their physical properties.

Example 5

Partially-chlorinated copper phthalocyanine is produced according to well-known prior art methods by reacting phthalic anhydride, 4-chlorophthalic acid, urea, and copper chloride, in the presence of a catalyst in a kerosene medium to produce the crude product. The thus-formed crude at a solids content of about 12% is flushed from the reaction medium into concentrated sulfuric acid using one part of crude copper phthalocyanine (100% copper phthalocyanine basis) to 9 parts 98% sulfuric acid and then subjected to a two-stage dilution of the type described in Example 1.

The hydrolysis of the tetrahydrosulfate results in pigmentary semi-chlor copper phthalocyanine essentially all of which is in the α I phase. The sulfuric acid concentration of the mixture is 35% and the pigment concentration is 3 to 7%.

A 1000 cc. portion of the slurry is put into the reactor vessel as in Example 1 and heated to 90° C. There is then added 4.5% sodium salt p-toluene sulfonic acid and 7.5% tetrachloroethylene, the percentages being based on the pigment weight. Agitation at the rate of 660 r.p.m. is maintained for one hour with the temperature at 90° C. The slurry is then filtered hot through the filter cloth to give a filter rate of 23 kg./m.²/hr.

Examples 6–10

The same procedure and equipment described in Example 1 is utilized but the mixture of surfactant and tetrachloroethylene is replaced with an organic compound as follows:

| | Compound used | Wt. percent (based on pigment in slurry) | Time (90° C.) | Agitation (r.p.m.) |
|---|---|---|---|---|
| Example: | | | | |
| 6 | β-Naphthol | 1.2 | 1.5 | 660 |
| 7 | Salicylic acid | 2 | 2 | 660 |
| 8 | Benzoic acid | 2.2 | 1.5 | 660 |
| 9 | Phthalic anhydride | 1.3 | 1.5 | 660 |
| 10 | Do | 3.5 | 2.5 | 660 |

In each case there results a slurry of improved filterability characteristics without sacrifice in pigment quality.

In each of Examples 1–10, above, the recovery of the pigment, following steps of precipitation and intense agitation to foam the slurry, is effected by means of a test procedure which is intended to simulate on a laboratory scale the filterability that can be expected using a commercial size rotary vacuum filtering device. The test involves the use of the "Straight Line Filter Büchner Funnel Test" described in SLF Bulletin No. 9 of Straight Line Filters Inc., Wilmington, Del. 19899, giving projected filtration rates in terms of gms./m.²/hr. of filtration surface. Continuous filament polyester filter cloths are selected for their satisfactory performance in the acid media employed.

In any event the improved conditioning step of the present invention makes it possible to use the rotary vacuum filtering systems, indeed achieving filtration rates several times as great as those which could otherwise be obtained and a complete absence of bleed. Rotary vacuum filtering systems are of course advantageous for their efficient and economical operation on a continuous basis.

What is claimed is:

1. In a process for the production of phthalocyanine pigment by the steps of (1) preparing a solution of crude metal phthalocyanine in concentrated sulfuric acid, (2) rapidly diluting said sulfuric acid solution of crude phthalocyanine with water or with dilute sulfuric acid in a first-stage mixing zone, the dilution being effected to provide a liquid-phase acid concentration of about 64 to about 82% by weight and a temperature of about 86° to 140° C., whereby said phthalocyanine is precipitated almost exclusively as the corresponding phthalocyanine tetrahydrosulfate, (3) holding said phthalocyanine tetrahydrosulfate for a brief period to generate particles within the size range of 0.01 to 0.2µ, (4) discharging the resultant slurry into a second-stage mixing zone and effecting rapid dilution with water to a liquid-phase acid concentration below about 40% by weight, (5) subjecting the thusly diluted slurry to a conditioning step to effect crystal growth and perfection, and (6) recovering said phthalocyanine pigment; improving the filterability of the particles by effecting conditioning step (5) for a period of at least 20 minutes at a temperature of 50° C. to the boil and under intense agitation thereby to generate an air/liquid interface and facilitate flocculation of the particles, the agitation being sufficient to foam and thereby increase the volume of the slurry by at least 15%.

2. Process according to claim 1 wherein the generation of the air/liquid interface is facilitated by inclusion in the slurry during agitation of a mixture of sodium p-toluene sulfonic acid and tetrachloroethylene.

3. Process according to claim 1 wherein said pigment recovery in step (6) is effected by means of a rotary filtering device.

References Cited
UNITED STATES PATENTS
| | | | |
|---|---|---|---|
| 3,717,493 | 2/1973 | Griswold | 260—314.5 |
| 2,375,120 | 5/1945 | Loukomsky et al. | 260—314.5 |

FOREIGN PATENTS
| | | | |
|---|---|---|---|
| 843,051 | 8/1960 | Great Britain | 260—314.5 |

HARRY I. MOATZ, Assistant Examiner